(12) United States Patent
Gutnik et al.

(10) Patent No.: US 8,953,192 B2
(45) Date of Patent: Feb. 10, 2015

(54) ROVING PRINTING IN A CLOUD-BASED PRINT SERVICE USING A MOBILE DEVICE

(75) Inventors: Yevgeniy Gutnik, Cupertino, CA (US); Tyler Odean, San Francisco, CA (US); Robert Toscano, San Francisco, CA (US); Abhijit Kalamkar, Sunnyvale, CA (US); Akshay Kannan, Fremont, CA (US); Yuri Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 13/275,301

(22) Filed: Oct. 17, 2011

(65) Prior Publication Data

US 2014/0368865 A1    Dec. 18, 2014

(51) Int. Cl.
G06K 15/00 (2006.01)
G06F 3/12 (2006.01)

(52) U.S. Cl.
USPC .......................................... 358/1.14; 358/1.15

(58) Field of Classification Search
None
See application file for complete search history.

(56) References Cited

U.S. PATENT DOCUMENTS

| | | | |
|---|---|---|---|
| 5,828,864 A | 10/1998 | Danknick et al. | |
| 6,453,129 B1 | 9/2002 | Simpson et al. | |
| 6,829,059 B1 | 12/2004 | Kimura | |
| 7,092,119 B1 | 8/2006 | Hinds et al. | |
| 7,411,690 B2 | 8/2008 | Tsukada et al. | |
| 7,900,144 B1 | 3/2011 | Edge et al. | |
| 8,477,350 B2 | 7/2013 | Jazayeri et al. | |
| 2003/0084132 A1 | 5/2003 | Ohta | |
| 2003/0197887 A1* | 10/2003 | Shenoy et al. | 358/1.15 |
| 2004/0114175 A1 | 6/2004 | Cherry et al. | |
| 2005/0158100 A1 | 7/2005 | Yamaguchi | |
| 2005/0213115 A1* | 9/2005 | Johnson et al. | 358/1.1 |
| 2006/0095500 A1 | 5/2006 | Kato | |
| 2006/0158680 A1 | 7/2006 | Fujinawa et al. | |
| 2007/0086054 A1 | 4/2007 | Ikeno | |
| 2007/0146778 A1* | 6/2007 | Kitagata et al. | 358/1.15 |
| 2007/0159650 A1 | 7/2007 | Takamatsu et al. | |
| 2007/0253020 A1 | 11/2007 | Hull et al. | |
| 2008/0137121 A1 | 6/2008 | Chrisop et al. | |
| 2008/0184162 A1 | 7/2008 | Lindsey et al. | |
| 2009/0276266 A1 | 11/2009 | Nishiyama | |
| 2010/0302579 A1 | 12/2010 | Nuggehalli et al. | |

(Continued)

FOREIGN PATENT DOCUMENTS

| | | |
|---|---|---|
| EP | 1465052 A2 | 10/2004 |
| WO | 2011115987 A2 | 9/2011 |
| WO | 2013059190 A1 | 4/2013 |

OTHER PUBLICATIONS

"Server Message Block", from Wikipedia, the free encyclopedia, Aug. 24, 2012, 9 pages.

(Continued)

*Primary Examiner* — Vincent Rudolph
(74) *Attorney, Agent, or Firm* — Brake Hughes Bellermann LLP

(57) ABSTRACT

An application manager may receive, from an application utilized at a device at a first location, a print job, the print job identifying a virtual print queue and application content to be printed, the application manager being further configured to store the print job in association with the virtual print queue. A print job router may receive, after the storing and from a mobile device at a second location, a print initiation identifying a printer at the second location and the print job, the print job router being further configured to send the application content to the identified printer, based on the print initiation.

19 Claims, 12 Drawing Sheets

(56) References Cited

U.S. PATENT DOCUMENTS

| | | | |
|---|---|---|---|
| 2010/0309504 A1* | 12/2010 | Partridge et al. | 358/1.15 |
| 2010/0309508 A1 | 12/2010 | Kamath et al. | |
| 2010/0328707 A1 | 12/2010 | Miyake | |
| 2011/0075164 A1 | 3/2011 | Nordback | |
| 2011/0085196 A1* | 4/2011 | Liu et al. | 358/1.15 |
| 2011/0096354 A1 | 4/2011 | Liu | |
| 2011/0176167 A1 | 7/2011 | Takagi et al. | |
| 2011/0222104 A1 | 9/2011 | Mohammad et al. | |
| 2011/0235085 A1 | 9/2011 | Jazayeri et al. | |
| 2011/0242554 A1 | 10/2011 | Farry et al. | |
| 2011/0252071 A1 | 10/2011 | Cidon | |
| 2011/0299110 A1 | 12/2011 | Jazayeri | |
| 2012/0057193 A1 | 3/2012 | Jazayeri | |
| 2012/0079081 A1* | 3/2012 | Parks et al. | 709/220 |
| 2012/0081740 A1* | 4/2012 | Takagi et al. | 358/1.15 |
| 2012/0147420 A1* | 6/2012 | Nishimi et al. | 358/1.15 |
| 2013/0021638 A1* | 1/2013 | Hong et al. | 358/1.14 |
| 2013/0083337 A1* | 4/2013 | Tecu et al. | 358/1.13 |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

Internet Printing Protocol. from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

International Search Report and Written Opinion for Application No. PCT/US2012/060413, mailed Mar. 13, 2013, 11 pages.

Notice of Allowance for U.S. Appl. No. 12/725,067, mailed Mar. 25, 2013, 7 pages.

Non-Final Office Action Response for U.S. Appl. No. 12/725,067, filed Jan. 28, 2013, 15 pages.

Final Office Action for U.S. Appl. No. 13/275,300, mailed Dec. 17, 2013, 12 pages.

* cited by examiner

ROVING PRINTING IN A CLOUD-BASED PRINT SERVICE USING A MOBILE DEVICE

TECHNICAL FIELD

This description relates to roving printing.

BACKGROUND

Users of computing devices and associated applications often desire to print specific documents or other application content. In an example user experience, an owner of a computer running a particular operating system purchases a printer, and then installs a version of a printer driver associated with the user's operating system onto the computer. In other example scenarios, a printer (i.e., associated printer driver) may be installed in the context of a network. In the latter scenario(s), it is possible to share the installed printer among multiple network users. For example, a local computer executing an application, operating system, and printer driver, may print from the application to a remote printer, using an intermediary print server. Somewhat similarly, an application may execute on a remote device, and the operating system and printer driver may be installed on the remote device, as well. Then, a user may experience or use the remotely-executing application at a local computer (e.g., in a remote desktop or other virtual computing environment), and may print to a local or remote printer which receives commands from the remotely-installed printer driver.

In many cases, a user may not be co-located with a desired printer at a time of identifying a document to be printed. For example, in the network printing example(s) above, a user at a network workstation may wish to print to a printer which is located on a different floor, or in a different building. In these and other scenarios, it may occur that a user wishes to initiate the actual printing of the document while the user is present at the identified printer. For example, the user may wish to maintain a confidentiality of the printed document, and may therefore wish to initiate the printing while present at the printer, so as to avoid an availability of the printed document at the printer while the user is in transit from the workstation to the printer (during which time unauthorized users may inadvertently or illicitly view or obtain the printed document).

Thus, for these and other reasons, printing techniques have been developed which enable a user to designate printing of a document at a first time (e.g., when the user is present at the workstation), without initiating actual printing of the document until a second, later time (e.g., when the user is present at the relevant printer). More specifically, for example, the user may send a print job for a given document to be temporarily stored remotely (e.g., at a network print server). Then, once the user has travelled from the workstation to the relevant printer, the user may interact with the relevant printer to initiate the printing of the document at the relevant printer. For example, the user may utilize input/output hardware and/or software at the relevant printer to fetch and otherwise initiate and execute the print job. In this way, the user may be assured of being present at the printer at the time of printing of the document. In particular, with respect to a need for maintaining a confidentiality of the document to be printed, the hardware/software of the printer may include authentication functionalities for authenticating the user before initiating the printing of the document, so as to thereby further protect the confidentiality of content of the printed document.

Notwithstanding the features and associated advantages of the above (and related/similar) printing techniques, users may further benefit from additional or alternative techniques for enabling enhanced flexibility, convenience, and confidentiality in printing scenarios in which a relevant printer is not co-located with a user/device which originates a given print job.

SUMMARY

According to one general aspect, a print server may include instructions stored on a computer-readable medium and executable by at least one processor. The print server may include an application manager configured to cause the at least one processor to receive, from an application utilized at a device at a first location, a print job, the print job identifying a virtual print queue and application content to be printed, the application manager being further configured to store the print job in association with the virtual print queue. The print server may include a print job router configured to cause the at least one processor to receive, after the storing, a print initiation identifying a printer at a second location, the print initiation identifying the print job, including print properties thereof, and originating from the second location. The print server may include a format converter configured to cause the at least one processor to generate, from the application content and using the print properties, a printable file in a format printable by the identified printer, for sending to the identified printer by the print job router.

According to another general aspect, a method may include receiving, from an application utilized at a device at a first location, a print job, the print job identifying a virtual print queue and application content to be printed. The method may include storing the print job in association with the virtual print queue, and receiving, after the storing, a print initiation identifying a printer at a second location, the print initiation identifying the print job, including print properties thereof, and originating from the second location. The method may further include generating, from the application content and using the print properties, a printable file in a format printable by the identified printer, for sending to the identified printer by the print job router.

According to another general aspect, a computer program product may be tangibly embodied on a computer-readable storage medium. The computer program product may include executable code that, when executed, is configured to cause a data processing apparatus to receive, from an application utilized at a device at a first location, a print job, the print job identifying a virtual print queue and application content to be printed, and store the print job in association with the virtual print queue. The executable code, when executed, may be configured to cause the data processing apparatus to receive, after the storing, a print initiation identifying a printer at a second location, the print initiation identifying the print job, including print properties thereof, and originating from the second location, and generate, from the application content and using the print properties, a printable file in a format printable by the identified printer, for sending to the identified printer by the print job router.

According to another general aspect, a print server may include instructions stored on a computer-readable medium and executable by at least one processor. The print server may include an application manager configured to cause the at least one processor to receive, from an application utilized at a device at a first location, a print job, the print job identifying a virtual print queue and application content to be printed, the application manager being further configured to store the print job in association with the virtual print queue. The print server may include a print job router configured to cause the at least one processor to receive, after the storing and from a mobile device at a second location, a print initiation identifying a printer at the second location and the print job, the print job router being further configured to send the application content to the identified printer, based on the print initiation.

According to another general aspect, a method may include receiving, from an application utilized at a device at a first location, a print job, the print job identifying a virtual print queue and application content to be printed. The method may include storing the print job in association with the virtual print queue, and receiving, after the storing and from a mobile device at a second location, a print initiation identifying a printer at the second location and the print job. The method may include sending the application content to the identified printer, based on the print initiation.

According to another general aspect, a computer program product may be tangibly embodied on a computer-readable storage medium. The computer program product may include executable code that, when executed, is configured to cause a data processing apparatus to receive, from an application utilized at a device at a first location, a print job, the print job identifying a virtual print queue and application content to be printed, and store the print job in association with the virtual print queue. The executable code, when executed, may be configured to cause the data processing apparatus to receive, after the storing and from a mobile device at a second location, a print initiation identifying a printer at the second location and the print job, and send the application content to the identified printer, based on the print initiation.

The details of one or more implementations are set forth in the accompanying drawings and the description below. Other features will be apparent from the description and drawings, and from the claims.

DETAILED DESCRIPTION

Figure 1:
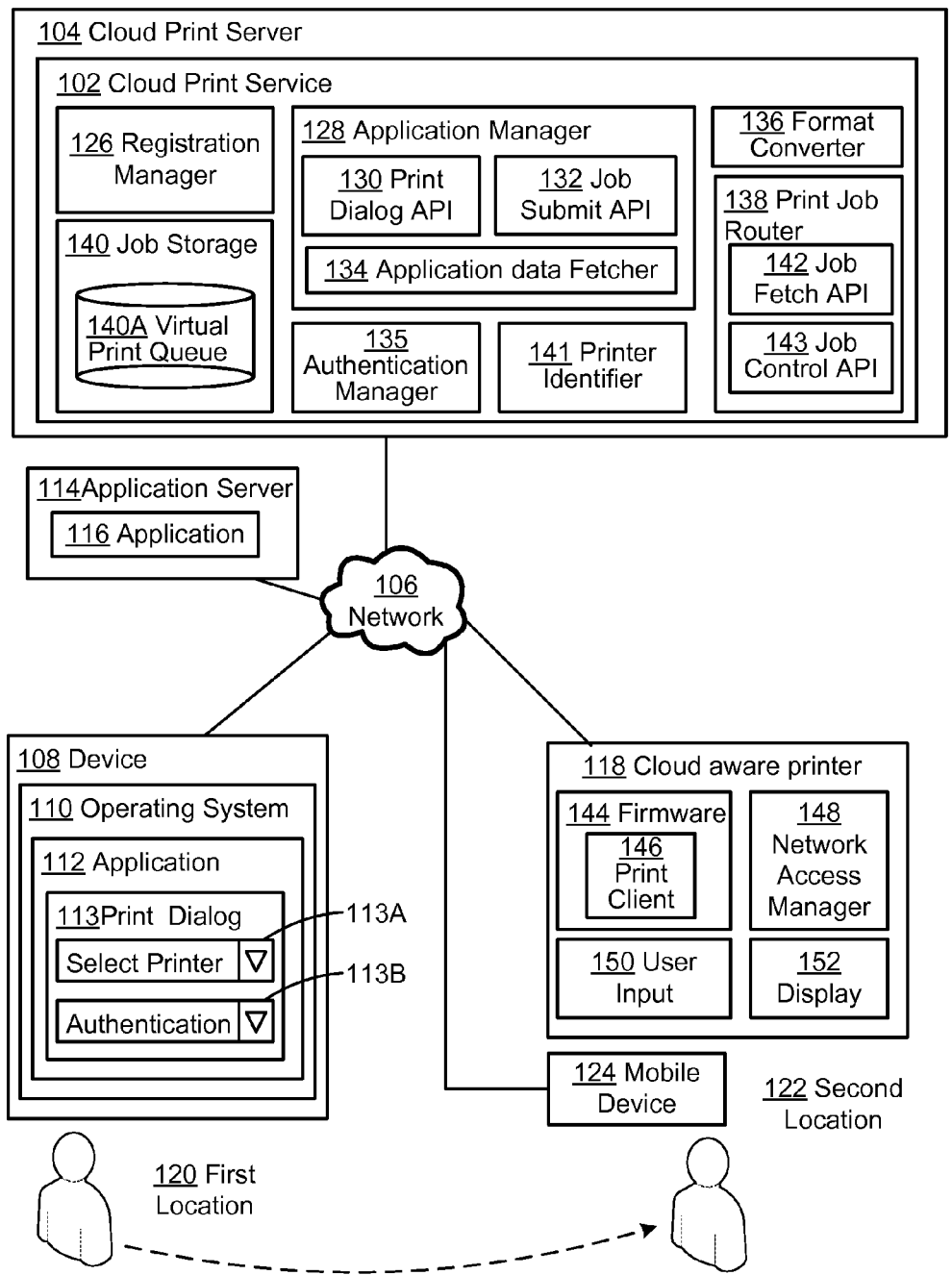
FIG. 1 is a block diagram of a system for implementing roving printing using a cloud print service.

FIG. 1 is a block diagram of a system 100 for implementing roving printing using a cloud print service 102. As shown in the example of FIG. 1, the cloud print service 102 may be executed on a cloud print server 104 which provides printing capabilities over a network 106. As described herein, the cloud print service 102 therefore provides a user with a uniform printing experience which is platform-independent and which unburdens the user of the need to configure, update, or otherwise maintain or oversee printer operations. Moreover, as also described herein in further detail, the cloud print service 102 provides enhanced flexibility, convenience, and confidentiality in roving printing scenarios in which a relevant printer is not co-located with a user/device which originates a given print job. Various other features and advantages of the cloud print service 102 are described in detail below, and/or would be apparent.

In FIG. 1, a device 108 is illustrated as an example of virtually any computing device from which a user may wish to identify, designate, or submit a print job. By way of non-limiting example, then, the device 108 may include a laptop or desktop computer, a netbook, a tablet computer, a smartphone, a camera, or any device which may store or have access to data which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print, or combinations thereof.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner or other provider of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system 100 of FIG. 1.

The network 106 may thus represent, for example, the public Internet or other wide area public or private network. The network 106 may represent, in further examples, a corporate or other intranet, and/or a smaller-scale, local or personal network, any of which (and/or combinations thereof) may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 102 may make use of the cloud-aware printer 118, as described in detail, below.

For example, the cloud print service 102 may be configured to register the user and/or the device 108, as well as the cloud-aware printer 118. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 102 to the legacy printer. It will be appreciated that all of the various features and functions of the cloud-aware printer 118 may be obtained through the use of a legacy printer supplemented with appropriate hardware/software support.

In short, the system 100 provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In particular, as referenced above, the system 100 may provide a number of enhanced features and functions related to roving printing. For example, in the example of FIG. 1, the application 112 may provide a print dialog 113 in conjunction with the cloud print service 102. For example, as shown, the device 108 may be located at a first location 120, while the cloud-aware printer 118 may be located at a different, second location 122. Thus, a user 125 utilizing the device 108 at the first location 120 may select application content associated with the application 112 (and/or application 114) for printing, and may submit (an identification of) the application content to the cloud print service 102, along with a specific or generic reference to, or identification of, the cloud-aware printer 118.

At a subsequent time, the user 125 may have traveled from the first location 120 to the second location 122. At that time, the user 125 may request or otherwise initiate an actual printing of the previously-identified application content at the cloud-aware printer 118. In other words, as described in detail in various example implementations below, the user 125 may directly or indirectly cause the cloud-aware printer 118 to fetch or otherwise receive the application content to be printed, so as to thereby obtain the printed content from the cloud-aware printer 118.

In this way, the user 125 may obtain confidential, secure printing, in a manner which is convenient and flexible. For example, in a first example, the user 125 may be present at the first location 120, and may be aware of, and may wish to print application content using, the cloud-aware printer 118 at the second location 122. For example, the user 125 may be a student, employee, or other user of a plurality of printers designated for use by a corresponding group of users of which the user 125 is a member. For example, the user 125 may represent an employee in an office who wishes to print to the cloud-aware printer 118, which may be located on a different floor or in a different building. In other examples, the user 125 may represent a student in a dorm room who wishes to print to the cloud-aware printer 118 which is located at a student center.

In the above and similar examples, the user 125 may have specific knowledge of an identity or location of the cloud-aware printer 118. However, in many other examples, it may occur that the user 125 has no specific knowledge of an identity or location of the cloud-aware printer 118 that will ultimately be used to print specified application content. For example, in the above examples, the user 125 may represent an employee or student who submits an identification of application content to be printed, without knowing at that time exactly where or when the user 125 will be when initiating the actual printing of the identified application content. For example, the user 125 may be traveling in a different city, and may not even be aware of a location or existence of the cloud-aware printer 118 that will ultimately be utilized in printing the identified application content. In such scenarios, as described in detail herein, the user 125 may submit the identification of the application content to be printed in a manner which is generic to available printers associated with the cloud print service 102 and with the user 125 (including the cloud-aware printer 118 in this context), and may nonetheless thereafter identify and utilize the cloud-aware printer 118 while present at the second location 122.

More specifically, as referenced above and as shown in FIG. 1, the application 112 may provide, in conjunction with the cloud print service 102, a print dialog 113 which enables the user 125 to provide a print submission identifying application content to be printed. In this regard, the print dialog 113 may be understood to include various conventional features associated with conventional print dialogs, which are therefore not included or described in specific detail herein.

As shown in FIG. 1, the print dialog 113 may include a printer selection drop-down list 113A which the user 125 may utilize to provide a submission of a print job to the cloud print service 102. Specifically, the printer selection drop-down list 113A may enable the user 125 to identify the cloud-aware printer 118 specifically, or, in other example implementations, may enable the user 125 to generically identify a printer associated with the user 125 and with the cloud print service 102 (at a present or future time), so that the user 125 may specifically identify the generically identified printer, at the time that the user 125 is present at the second location 122. In the latter examples, for example, the printer selection list 113A may identify a number of specific printers, as well as a virtual printer or virtual print queue which, as just described, generically represents a currently-unidentified printer to be identified at the later time at which the user 125 is present at the second location and wishes to initiate actual printing of the print job.

In an example of advantageous features provided by the system 100, the user 125 may thus experience an enhanced confidentiality or security of content that is printed using the cloud-aware printer 118. For example, in the implementations described herein, relevant documents are only printed by the cloud-aware printer 118 while the user 125 is present at the second location 122, and are not printed prior to an arrival of the user 125 at the second location 122. In this way, the printed documents are not left unattended, such as may occur in conventional remote printing scenarios in which printed documents are unattended while the user 125 is in transit from the first location 120 to the second location 122. As a result, the user 125 need not be concerned that unauthorized users may unintentionally or illicitly obtain possession of the documents to be printed.

Additionally, to further enhance these and related aspects which are associated with a confidentiality or security of the printed document, additional authentication of the user 125 may be required before printing of the documents may be allowed to commence. In this way, the user 125 (or other authorized users) may be further assured of being the only user(s) able to retrieve the printed documents in question.

For example, as described in more detail herein, the user 125 may utilize the cloud-aware printer 118 to provide identifying or other authenticating information, which may then be verified by the printer 118 and/or the cloud print service 102 (e.g., using authentication manager 135), so that printing of the requested documents may commence. For example, such authentication may include submission of a password or pin by the user 125, the swiping of an ID card using a card reader, the reading of a badge of a user 125, or many other identification/authentication techniques, some of which are described or referenced in more detail, below.

In the example of FIG. 1, as also described in more detail herein, the print dialog 113 may include an authentication drop-down list 113B, which may enable the user 125 to specify an existence, type, or characteristic of authentication techniques to be used. For example, the authentication drop-down list 113B may enable the user 125 to select one or more of the just-described authentication techniques, or other authentication techniques. In other examples, the authentication drop-down list 113B may enable the user 125 to characterize or parameterize such authentication techniques. For example, the user 125 may be enabled to provide a particular password or pin which may later be required at the second location 122 in order to initiate printing.

In particular examples described in detail herein, e.g., with respect to FIG. 2B and FIGS. 3A-3G, the user 125 may utilize a mobile device 124 at the second location 122 in order to initiate and execute the printing of identified documents by the cloud-aware printer 118. For example, as described, the user 125 may utilize the device 108 at the first location 120 to provide a submission of a print job identifying application content to be printed. The print job (e.g., the actual application content to be printed and/or a reference or other identifier to the application content) may be stored using the cloud print service 102, so that, at a later time, the user 125 may arrive at the second location 122 while carrying the mobile device 124.

Then, the user 125 may utilize the mobile device 124, e.g., to identify the cloud-aware printer 118, and/or to otherwise communicate with the cloud print service 102 so as to provide the application content to be printed to the cloud-aware printer 118.

For example, the mobile device 124 may include or represent virtually any device which may be carried by the user 125 while in transit, including, e.g., a cell phone, Smartphone, tablet computer, netbook, notebook, or any such device. Thus, the mobile device 124 may include a wide range of possible feature sets, ranging from basic network connectivity all the way to providing full support for applications 112, 116, and browser-based support for communicating with the cloud print service 102 and/or the cloud-aware printer 118. In particular, it may be appreciated that, in various examples, the mobile device 124 may be the same device 108 used by the user at the first location 120, or it may be an entirely different device.

Of course, the mobile device 124 is a non-limiting example of devices which may be used by the user 125 in the system 100. For example, the user 125 may utilize a kiosk or other computing device in a vicinity of the cloud-aware printer 118 in order to authenticate with the cloud print service 102 and, as described herein, release and execute one or more desired print jobs.

In the example of FIG. 1, it may be appreciated that use of the mobile device 124 in the context of the system 100 may provide the user with a high degree of convenience and flexibility in utilizing and implementing the roving printing scenarios described herein. For example, it may be appreciated that the mobile device 124 may typically be familiar to the user 125, so that the user 125 experiences a uniform interface with the cloud print service 102 and/or the cloud-aware printer 118, even though the user may utilize a large number of varying types of printers represented by the cloud-aware printer 118 in the example of FIG. 1.

Further, it may be appreciated that, in such scenarios, since all the required functionality for interacting with the cloud print service 102 and/or the cloud-aware printer 118 may be implemented using the mobile device 124, a minimal or substantially reduced feature set may be required at the cloud-aware printer 118 itself. That is, for example, the cloud-aware printer 118 may be manufactured with a minimal hardware/software set required for communicating with the cloud print service 102. In particular, as described in detail herein, use of the mobile device 124 may reduce or eliminate a need of the cloud-aware printer 118 to maintain data associated with authenticating the user 125 in the various authentication scenarios described herein. As a result, manufacturers of the cloud-aware printer 118 may be enabled to provide low cost printers which are nevertheless fully compatible with the roving printer scenarios described herein.

As shown in FIG. 1, the cloud print service 102 may include a number of example components or modules which may be utilized to implement functionalities of the cloud print service 102, and, in particular, may be utilized to implement the various roving printing scenarios described herein. For example, the cloud print service 102 may include a registration manager 126, which may be configured to register printers and users. Thus, it may be appreciated that, through the use of the registration manager 126, the user 125 may register with the cloud print service 102, and may thereafter interact with the registration manager 126 to login to and utilize the cloud print service 102. For example, the registration manager 126 may store a username and password of the user 125, which the user 125 may provide, e.g., in conjunction with the original print job submission identifying application content to be printed (i.e., using the device 108). Similarly, the user 125 may, in the example scenarios, use the same username/password to authenticate to the cloud print service 102 while present at the second location in attempting to initiate actual printing of the application content. In particular, as shown and described, the user 125 may utilize the mobile device 124 to provide the relevant username/password to the registration manager 126 for authentication of the user at the client print service 102.

Somewhat similarly, the cloud-aware printer 118, as well as various other printers (not specifically illustrated in the example of FIG. 1), may be registered with the registration manager 126. In the described examples, it may be appreciated that a particular subset of such printers, including the cloud-aware printer 118, may be associated with the user 125. That is, the registration manager 126 may register a plurality of users and a plurality of printers, and may associate various subsets of users with various subsets of printers, depending on associated authorizations or permissions of the users/printers. For example, a given user may register a number of printers with a user account of the user. In other examples, a network administrator may associate a plurality of printers with a given user. In still other examples, the registration manager 126 may enable sharing of printers between users, so that, for example, a first user registered in association with the cloud-aware printer 118 may share the cloud-aware printer 118 with the user 125.

In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

Thus, it may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user 125 once the user 125 is logged on into the application 116.

Further in FIG. 1, an application manager 128 may be configured to communicate with any application which may be desired to be used for printing within the system 100, including, e.g., the application 112, and the application 116. Thus, for example, the application manager 128 may implement various application programming interfaces (APIs) which enable such communication with external applications.

For example, the application manager 128 may include a print dialog API 130, which may be configured to render the print dialog 113. That is, as referenced above, the print dialog API 130 may render the print dialog 113 as including, e.g., the printer list 113A, the authentication list 113B, as well as associated printer capabilities, and other relevant information. The print dialog API 130 may render the print dialog 113, e.g., using Java script. It may be appreciated that the print dialog API 130 may thus provide or render the print dialog 113, and may thereby provide a common print dialog experience across all applications (e.g., applications 112, 116) interfacing with the cloud print service 102.

In additional or alternative example implementations, the print dialog API 130 also may provide sufficient information for an application developer to construct a third party print dialog, which may be different in appearance than the print dialog 113, e.g., may have a proprietary appearance associated with a suite of applications provided by the developer/provider thereof. In this way, the user 125 may provide desired printer selections and associated desired print characteristics, as well as identification of the actual content to be printed. As may be appreciated, such print data may be expressed in any conventional format, e.g., HTML, PDF, XPS, or an image format such as JPEG, to name a few.

A job submit API 132 may be utilized to receive the identification of application content submitted by the user 125 by way of the print dialog 113. For example, in some implementations, the user 125 may submit identification of the application content of the application 112 which is executed and stored locally using the device 108. In such cases, a format and associated print characteristics of the application content may be identified or otherwise specified at the time of submission thereof, and related values may be stored as such using the cloud print service 102, for later printing by the cloud-aware printer 118.

To give a specific example, the application 112 may include a spreadsheet application 112 executing on the device 108. In such an example, the user 125 may print a particular sheet of the spreadsheet application 112, and associated values for related print characteristics may be defined for storage thereof until the later time at which the user 125 arrives at the second location 122 and initiates the associated printing. For example, a formatting of number of columns and rows of the spreadsheet to be printed may be designated for an associated paper size, and may be stored in a manner just described. Of course, it may be appreciated that similar comments may apply to virtually any type of application content to be printed, e.g., word processing documents, webpages, images, or other application content. Such scenarios are referred to herein as "print-by-value" print scenarios, in which, as just described, values for associated print characteristics or properties are defined and stored at a time of submission thereof by the user 125 at the device 108 at the first location 120, as received by the job submit API 132.

In contrast, in other example scenarios, the print data received by way of print job submission by the user 125 may be represented or otherwise included by reference to remote print data, e.g., by identification of an appropriate uniform resource location (URL). For example, as described herein, the user 125 may wish to print application content associated with the web application 116 running on the application server 114. By way of comparison to the previous example, the application 116 also may represent a spreadsheet application. In these examples, however, it may occur that the submission of the application content and associated print characteristics/properties need not be finalized at the time of submission. Rather, the job submit API 132 may simply receive and store a reference to the application content of the application 116 that is to be printed, without necessarily receiving or storing definite values for some or all of the related print characteristics. In such examples, at the later time at which the user 125 arrives at the second location 122 and initiates the actual printing of the spreadsheet of the application 116, an application data fetcher 134 may be configured to utilize the reference to the application 116 which was previously stored by the job submit API, to thereby obtain the relevant application content. Thus, such scenarios are referred to herein as "print-by-reference" print scenarios.

Whether executing a print-by-value or print-by-reference scenario, the job submit API 410 may be configured to submit a corresponding print job, including application content to be printed and associated print characteristics, to a format converter 136, which may be configured to execute a conversion of the print job into a format which is consistent and compatible with the cloud-aware printer 118. For example, the job submit API 132 may receive a print job, and, to give a specific and non-limiting set of examples, a hypertext transfer protocol (HTTP) multi-part request which may include the printer capabilities expressed, e.g., in XPS, as well as a MIME type identifying the content type.

Thus, the application manager 128 may generally implement the functions of receiving a print request, and then receiving an associated print job, from, e.g., the application 112, 116. In general, the first function of a receiving a print request may include providing the user 125 with the print dialog 113 or other user interface with which the user 125 may select an available/associated registered printer, and/or as described herein, with which the user 125 may select a generic or currently unidentified printer. Receiving the print job may include receiving print data to be printed, possibly along with print characteristics characterizing preferences and other aspects of how their print data is desired to be printed (e.g., color versus black and white, paper size orientation, number of copies, or any other relevant or desired print characteristic). The application manager 128 may conduct other communications with the application 112, 116, as well, such as, e.g., providing a status of the printer of a print job during the print job.

Thus, it may be appreciated that the application manager 128 may communicate with the application 112, 116 (or other application) in a format that is independent of a specific printer, e.g., that is generic with respect to all available or relevant printers within the system 100. In this way, the application 112, 116 may be relieved of some or all of the burdens associated with needing knowledge of the destination printer when formulating and/or sending a print job.

For example, when sending the print job, the application 112 may formulate both the print data and print characteristics in the same manner, regardless of whether the print job is destined for a particular identified printer, or is merely identified or associated with a generic, as yet undetermined, printer. In fact, even if the user 125 does not currently have any registered printer associated with his or her user account, the print job still may be forwarded to the cloud print service 102 for storage, and for later printing to the cloud-aware printer 118 or other printer that ultimately may be registered to the cloud print service 102 in conjunction with the account of the user 125, and at a time of arrival of the user 125 at such a printer at the second location 122.

Thus, it may be appreciated that the various APIs (e.g., 130, 132) utilized by the application manager 128 and/or the applications 112, 116 may represent lightweight, consistent, customizable, and easily implementable APIs which may be utilized in conjunction with a large number of various types of applications. Moreover, such APIs may rarely, if ever, need to be updated or maintained by the user 125 in order for the user 125 to utilize the cloud print service 102 in conjunction with a particular application. Instead, such updates may be managed by an administrator or other provider of a cloud print service 102 and/or by a provider of the application 112, so that the user 125 is unburdened of associated efforts and responsibilities.

Even as new printers are introduced into the marketplace over time, the user 125 may have the experience that the application 112 is able to utilize the new printers simply by way of registration of the new printers with the cloud print service 102. In particular, in the roving printing described herein, it may occur that the user 125 submits a print job at a first time and at the first location, at which time the cloud-aware printer 118 may not be registered in conjunction with the account of the user 125 at the registration manager 126, and/or at which time the cloud-aware printer 118 may not even have been manufactured or produced. Nonetheless, in example scenarios, at the second time at which the user arrives at the second location 122, it may be appreciated that as long as the cloud-aware printer 118 has been installed and associated with the account of the user 125 at that time, the user 125 may initiate the printing of the print job at that time.

As referenced above, such print jobs received at the application manager 128 in the printer-independent or generic format, which may be specifically or generically identified with one or more printers, may be passed to the format converter 136, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XML paper specification (XPF) provides such a fixed layout document, which is based on the eXtensible markup language (XML).

Thus, application content or other print data may be received from the application 112 in virtually any format, including, e.g., hypertext markup language (HTML), or in the format associated with document processing applications and/or images, or any PDF or XPF formats referenced above. The format converter 136 may thus be configured to receive print data in these and any other various formats, and to convert the print data into a format that is recognizable by a designated printer, e.g., that is recognizable by the cloud-aware printer 118 that is designated and identified by the user 125 upon the arrival of the user 125 at the second location.

Similarly, as referenced above, the format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. For example, a given printer may be a black and white printer with no two-sided printing abilities, while a second printer may be a color printer with two-sided printing. The format converter 136 may thus provide appropriate conversion, depending on a selected printer and/or on preferences of the user 125. The format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

As described herein, such preferences of the user 125 may be expressed at a time of submission of the print job using the device 108. In additional or alternative implementations, however, it may not be necessary for the user 125 to specify all desired print characteristics associated with the print job in question. Rather, additional flexibility or convenience may be provided by allowing the user 125 to provide or specify such print characteristics while at the second location 122.

For example, in the spreadsheet example provided above, the user 125 may utilize the cloud-aware printer 118 and/or the mobile device 124 to submit various print characteristics to the format converter 136, while the user is located at the second location 122. Then, the formatter converter 136 may combine the thus-received print characteristics with the print job received from the application manager 128, e.g., using the application data fetcher 134 for retrieving print data by way of the stored reference to the application 116, so that the format converter 136 may thereafter proceed with finalizing a printable version of the application content which is compatible with the cloud-aware printer 118 and which conforms to the print characteristics specified by the user 125 at the second location 122. In this way, as referenced, the user 125 may be provided with significant convenience and flexibility in determining a final printed format of the application content in question, since the user 125 may configure relevant parameters even after arriving at the second location 122 of the cloud-aware printer 118. It may be appreciated that such features are thus provided to the user 125, even though the user 125 is not required to have knowledge of an identity or location of the cloud-aware printer 118 at the time of submission of the print job via the device 108 at the first location 120.

As may be appreciated from the above description, the cloud print service 102 may include job storage 140 which may provide one or more types of data storage related to operations of the cloud print service 102. For example, the job storage 140 may store print jobs and related information, where such print jobs/information may be stored prior to and/or after the format conversions provided by the format converter 136. For example, a print job may be stored in a printer-independent format in which the print job may have been received by the job submit API 132. In particular, the job storage 140 may store a link or other reference to the application 116, so as to facilitate and enable the above-described "print-by-reference" printing scenarios. In other example implementations, the job storage 140 may store converted print jobs in which all print values have been assigned, for later access thereof by the cloud-aware printer 118 or other printer, such as may occur in the above-described "print-by-value" printing scenarios.

Figure 3A:
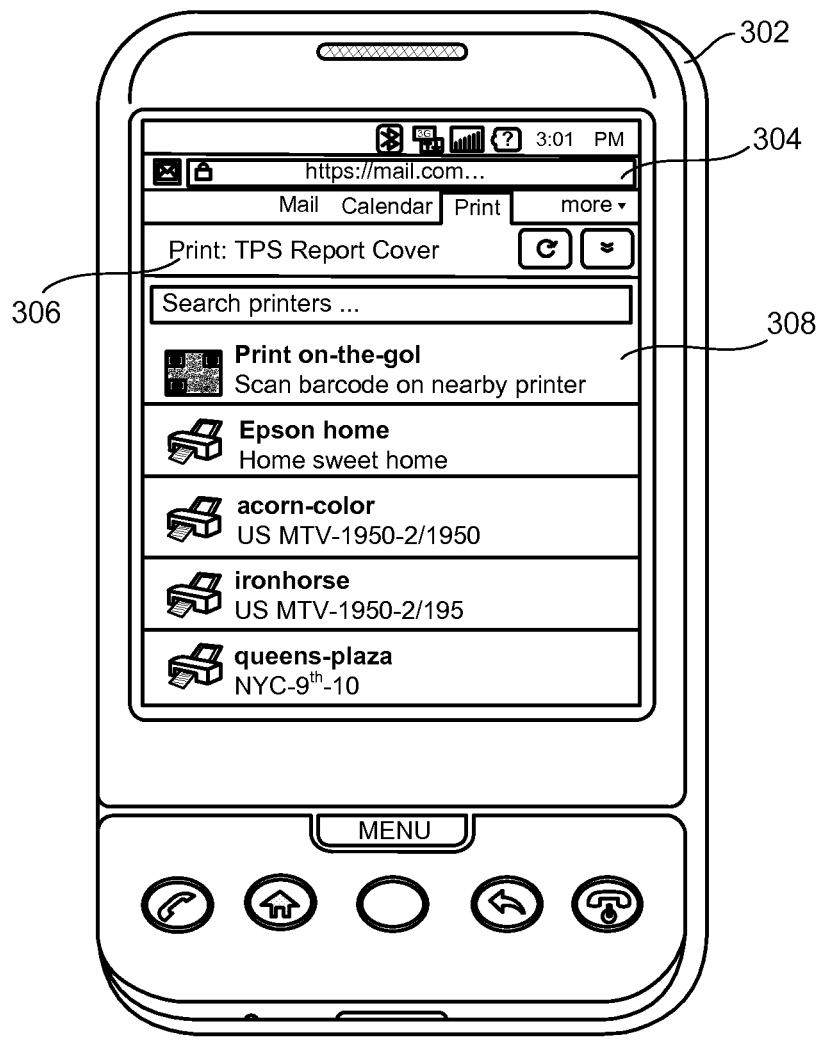
FIGS. 3A-3G are screenshots illustrating more detailed and/or specific more specific examples of the operation of system of FIG. 1.

In the example of FIG. 1, the job storage 140 may include a virtual print queue 140A which is specifically configured to receive and store print jobs from the device 108 which are designated for roving printing at a time of submission of the print job. For example, as may be appreciated from the present description (and as shown in FIG. 3A), the user 125 may utilize the print dialog 113 to select the virtual print queue 140A in conjunction with the printer selection drop-down list 113A. That is, the virtual print queue 140A may be represented within the provided printer list. In this way, as described, the user 125 may simply select the virtual print queue 140A from the list 113A, to thereby identify the associated print job within the job storage 140, so that the user 125 may retrieve the identified print job from the virtual print queue 140A upon arrival at the second location 122.

Thus, for example, it may be observed that print jobs of the user 125 may be stored in conjunction with the associated user account of the user 125, and in conjunction with one or more printers registered to that user and/or in conjunction with the virtual print queue 140A. As a result, print jobs may be committed to short term or long term storage, so that, for example, the user 125 may locate, identify, and re-print desired print jobs even if the user 125 later accesses the cloud print service 102 from a different location (e.g., the second location 122) and/or using a different device than the device 108.

Further, it may be observed that conversion of the print job at least partially occurs at separate devices from the one or more devices in which the originating application 112, 116 may itself be executing. In this way, for example, it is possible to formulate and submit a print job at least partially separately from a conversion of the print job into a printer-specific format, and to thereby divorce such conversion from an underlying operating system of the executing application, e.g., the operating system 110.

Further in the example of the cloud print service 102 of FIG. 1, a print job router 138 may be configured to route the converted print job from the format converter 136 and/or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, including the user 125, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job, e.g., a print job specified from within the virtual print queue 140A, or, in other embodiments, a next available print job for the cloud-aware printer 118.

The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

Further, a printer identifier 141 is illustrated which may be configured to receive a request from the user 125 at the second location (e.g., by way of the mobile device 124) to initiate a print job from the virtual queue 140A, as described herein. In such cases, the printer identifier 141 may be configured to receive an identification of the cloud-aware printer 118, e.g., using a bar code scanned by the mobile device, and to thereafter actually identify the cloud-aware printer 118, e.g., in conjunction with the registration manager 126. Thereafter, assuming the user 125 is registered with the cloud-aware printer 118, printing of the associated print job may proceed at the cloud-aware printer.

During execution, the printer job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced above.

More specifically, the print client 146 may be configured to register the cloud-aware printer 118 with the cloud print service 102, and to thereby associate the thus-registered printer 118 with a user of the device 108, e.g., the user 125. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, user input 150, and a display (or other user output) 152, which may generally represent otherwise-conventional components that are therefore not described here in detail except as may be needed to assist in understanding example operations of the system 100. Of course, the cloud-aware printer 118 need not include all of the components 144-152, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118. Similarly, the display 152 may represent virtually any sort of audio and/or video display to output information to the user 125 or other user of the cloud-aware printer 118.

It will be appreciated that many other configurations of the cloud-aware printer 118 or other printers are contemplated for use in conjunction with the system 100. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver 104 communicating with the legacy printer in question. Other variations and implementations of the printer 118 or related printers would be apparent, and are not described here in detail, except as may be necessary or helpful in understanding operations of the roving printer scenarios described herein.

Thus, it may be observed that the cloud print service 102 facilitates remote printing by the user 125, and, in particular, facilitates roving printing by the user 125 in which the user 125 submits a print job at the first location 120 using the device 108, and later initiates the actual printing of the print job while present at the cloud-aware printer 118 at the second location 122. Many variations on these and related roving printing techniques are described in detail, herein, or would be apparent to one of skill in the art.

Figure 2A:
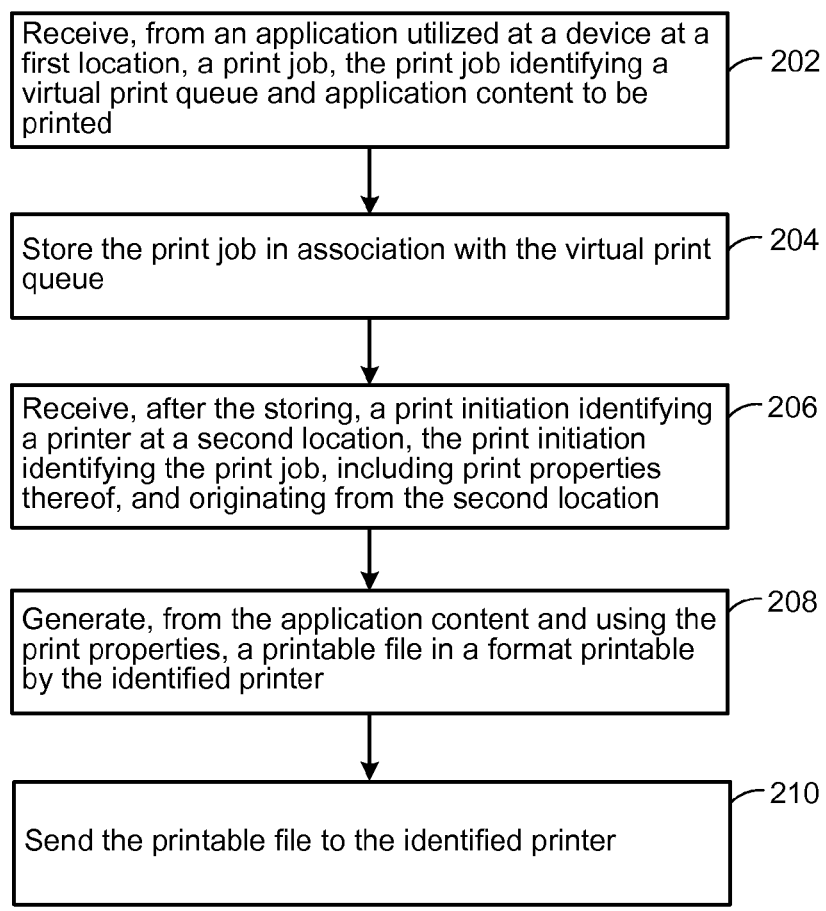
FIG. 2A is a flowchart illustrating example operations of the system of FIG. 1.
Figure 2B:
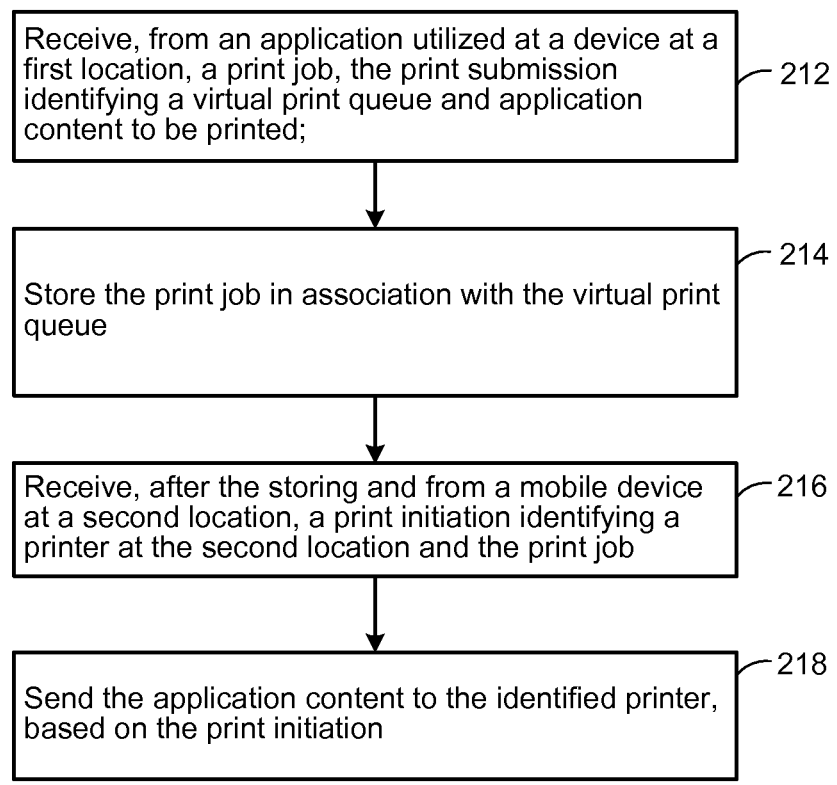
FIG. 2B is a second flowchart illustrating second example operations of the system of FIG. 1.

FIGS. 2A and 2B are flowcharts 200A and 200B, respectively illustrating example operations of the system of FIG. 1. Although the flowcharts of FIGS. 2A and 2B illustrate sequential, separate operations, it will be appreciated that such operations are merely for the sake of example, and that additional or alternative operations may be included. For example, operations of the flowchart 200A of FIG. 2A and/or operations of the flowchart 200B of FIG. 2B may be executed in different orders than those shown, and/or may be executed in partially overlapping or parallel manners, or in a nested, iterative, or looped fashion. Further, it may be appreciated that the operations of the flowcharts 200A, 200B may be partially or wholly combined with one another, e.g., operations of the flowchart 200A may be included in whole or in part in the operations of the flowchart 200B of FIG. 2B, and vice-versa.

In the example of FIG. 2A, a print job may be received from an application utilized at a device at a first location, where the print submission identifies a virtual print queue and application content to be printed (202). For example, the application manager 128, e.g., the job submit API 132, may receive a print job from the user 125 at the device 108, where the user 125 may be executing the application 116 of the application server 114 at the device 108.

In a specific example, as described above, the application 116 may include a spreadsheet application provided as a web application by the application server 114, and the user 125 may wish to utilize roving printing to print the spreadsheet in question. For example, as described, the user 125 may currently be located at the first location 120, and may or may not have knowledge or certainty of the cloud-aware printer 118 at the second location 122 as the printer that will ultimately be used to execute printing of the spreadsheet content.

Consequently, as described, the user 125 may utilize the printer selection list 113A of the print dialog 113 to select a virtual printer associated with the virtual print queue 140A for submission of the associated print job thereto. As may be appreciated, and as described above, the user 125 need not provide or determine all relevant print characteristics associated with the submitted print job. For example, since, as just described, the user 125 may not have a knowledge or awareness of the cloud-aware printer 118 as the ultimate destination of the submitted print job, the user 125 therefore may be understood to lack knowledge of available capabilities which may be required for certain print characteristics and options to be utilized. For example, the user 125 may desire a certain paper size, color option or other print options associated with the desired printing of the spreadsheet content of the application 116. However, in practice, it may occur that, upon arrival at the second location 122, the user may determine that the cloud-aware printer 118 to be utilized may lack some or all of the desired features.

Thus, in the example of FIG. 2A, the print job may be stored in association with the virtual print queue (204), and may be stored in a manner which is not required to designate or assign values for some or all available print options. For example, the job submit API 132 may be configured to store the submitted print job in conjunction with the virtual print queue 140A by storing a link or other reference to the application 116, where, again, values for the various associated print options need not be specified at a time of storage of the reference within the virtual print queue 140A.

After storing, a print initiation identifying a printer at a second location may be received, the print initiation identifying the print job and including print properties thereof, and originating from the second location (206). For example, the print job router 138 may be configured to receive such a print initiation from the user 125, e.g., by way of the cloud-aware printer 118 and/or the mobile device 124. For example, upon arrival at the second location 122, the user 125 may discover that the cloud-aware printer 118 has capability for printing using a desired paper size, but does not provide a capability for color printing. In such scenarios, the user 125 may, for example, utilize the user input 150 and the display 152 of the cloud-aware printer 118 to identify the desired print job and to submit the desired print properties for communication to the format converter 136 by way of the network access manager 148. In alternative examples, the user 125 may utilize the mobile device 124 to identify the desired print job and submit the desired print properties to be associated therewith. Advantageously, as described herein, it may be appreciated that the user 125 may designate such print properties while present at the second location 122 of the cloud-aware printer 118, and need not resolve or determine an inclusion or exclusion of such properties when originally submitting the print job at the device 108. As a result, the user 125 may be more likely to obtain the best possible printing results available in a given circumstance, with a high degree of convenience and flexibility in doing so.

In example scenarios, the print initiation may include an initial identification of the cloud-aware printer 118 (e.g., in a first message) to be validated by the printer identifier 141, followed by actual provision of the print properties (e.g., in a second message). In other words, as described herein, the user 125 may initially arrive at the cloud-aware printer 118 at the second location 122, and may scan a bar code of the cloud-aware printer 118 (or otherwise obtain identifying information therefore). The printer identifier 141 may receive this bar code or other identification information, and may access the registration manager 126 to identify the cloud-aware printer 118 and determine whether the user 125 is authorized for use thereof. Thus, in this regard, it may be appreciated that although the printer identifier 141 is illustrated as a separate component in the example of FIG. 1 or the sake of clarity, in fact the printer identifier 141 may be implemented as part of the registration manager 126 and/or the print job router 138.

From the application content and using the print properties, a printable file may be generated in the format that is printable by the identified printer (208). For example, the format converter 136 may utilize the application data fetcher 134 to consult the virtual print queue 140A and utilize the reference stored therein to retrieve the relevant application content and other data from the application server 114, whereupon the format converter 136 may utilize the referenced application content and any print properties stored in conjunction therewith (if any) using the job storage 140, together with print properties received from the user 125 and originating from the second location 122, to thereby provide the specified application content in a printable file in any format printable by the cloud-aware printer 118, and including the desired and specified print properties.

Finally in the example of FIG. 2A, the printable file may be sent to the identified printer (210). For example, the print job router 138 may be configured to communicate with the print client 136 to send the printable file to the cloud-aware printer 118, for printing thereby and receipt thereof by the user 125.

Thus, the examples of FIG. 2A illustrate roving printing scenarios in which the user 125 obtains the features of confidentiality, security, and convenience associated with not being required to specify a particular printer at a time of submitting a print job, while also enabling the user 125 to specify some or all print properties related to the print job after a time of arrival at the second location 122, and in conjunction with initiating a fetch of the print job in question from the cloud print service 102. As shown and described, such features and benefits may be obtained using the cloud-aware printer 118, and/or, optionally, using the mobile device 124. For example, it may be appreciated that the user input 150 and the display 152 of the cloud-aware printer 118 may be utilized to enable the user 125 to input desired print properties, fetch the print job in question, and otherwise communicate with the cloud print service 102.

Further, the user input 150 and the display 152 may represent various techniques for performing authentication of the user 125 prior to executing printing of the identified print job. For example, as described above, the various roving printing scenarios described herein may be associated with a requirement to authenticate a user 125 prior to the execution of a specified print job. In particular, the print dialog 113 may include the authentication drop-down list 113B which may enable the user 125 to select and parameterize or otherwise designate particular authentication methods which may be then required and executed using the authentication manager 135 of the cloud print service 102. For example, the authentication list 113B may enable the user 125 to submit preferences or specific types of authentication. For example, the user 125 may specify a particular password or PIN, which may thereafter be received by way of the user input 150 and the display 152 of the cloud-aware printer 118.

In other example implementations, authentication may be performed in conjunction with the mobile device 124. For example, as described in detail below, the user 125 may utilize the mobile device 124 to authenticate with the cloud print service 102 and/or the application server 114, e.g., by submitting an applicable username/password combination. In such implementations, it may be appreciated that a burden of providing and/or facilitating authentication at the cloud-aware printer 118 may be reduced or eliminated. For example, the cloud-aware printer 118 need not store or access username/password combinations associated with registered users. Moreover, since the user 125 may be likely to already utilize such authentication techniques in the context of the mobile device 124 when accessing the cloud print service 102 and/or the application server 114, it may be appreciated that the benefits of authentication utilized in conjunction with the roving print scenarios described herein may be recognized and received by the user 125 with a minimal or negligible increase in effort on the part of the user 125.

Thus, in the example of FIG. 2A, it may be observed that various "print-by-reference" printing scenarios are implemented, in which the mobile device 124 may optionally be used. Meanwhile, in the example of the flowchart 200B of FIG. 2B, printing scenarios are described in which "print-by-reference," "print-by-value," or other printing paradigms may be executed in conjunction with the use of the mobile device 124 at the second location 122.

Specifically, as shown, a print job may be received from an application utilized at a device at a first location, the print job identifying a virtual print queue and application content to be printed (212). For example, the job submit API 132 may receive such print jobs from the device 108, in conjunction with execution of the application 112 and/or the application 116, and including an identification of the virtual print queue 140A. Therefore, it may be appreciated that such a print job may include identification of relevant application content by virtue of a link or other reference thereto, as described above with respect to operation 202 of FIG. 2A, and/or may include a print job in which the associated application content is stored in conjunction with designated print properties using the job storage 140. For example, in the latter examples, in a "print-by-value" scenario, the user 125 may execute the application 112 at the device 108, and may be required, or may decide, to designate all desired print properties/characteristics associated with content of the application 112 to be printed.

Thus, independently of the above-described and other scenarios in which the print job may be received at the cloud print service 102, the print job may be stored in association with virtual print queue (214). For example, the job submit API 132 may store either the link or other reference to the application content, or may store the application content itself, utilizing the job storage 140.

Subsequently, after the storing, a print initiation may be received from a mobile device at a second location, the print initiation identifying a printer at the second location and the print job (216). For example, the printer identifier 141 may receive the identification of the cloud-aware printer 118 from the mobile device 124 and may select the cloud-aware printer 118 accordingly, and, based thereon, the print job router 138 may receive the print initiation for the identified printer from the mobile device 124 at the second location 122. As described herein, the mobile device 124 may send the print initiation including a first message which identifies the cloud-aware printer 118, followed by a second message which identifies the print job to be printed. As may be appreciated, the first message and the second message may be sent together or in sequence, and/or the information in both messages may be sent in a single message.

In response, the application content associated with the print job may be sent to the identified printer, based on the print initiation (218). For example, the print job router 138 may be configured to send application content stored using the job storage 140 and previously converted by the format converter 136 to the cloud-aware printer 118 for printing therewith. In alternative implementations, as referenced above, the format converter 136 may be required to complete conversion of stored or retrieved application content into a printable file which is printable by the cloud-aware printer 118, perhaps including print options entered by the user 125 using the mobile device 124 at the second location 122, for subsequent transmission by the print job router 138 to the cloud-aware printer 118. Additional and/or alternative implementations of the system 100 of FIG. 1 and the operations of the flowchart 200B of FIG. 2B are provided in detail with respect to the screenshots of FIGS. 3A-3G.

FIGS. 3A-3G illustrate screenshots related to example implementations of the systems and methods of FIGS. 1, 2A, and 2B. With reference to FIG. 2A, a mobile device 302 is illustrated which may represent an example implementation of the mobile device 124 of FIG. 1. In the examples of FIGS. 3A-3G, as may be understood from the above description of FIGS. 1, 2A, 2B, and as explained in more detail below with respect to FIG. 4, it is assumed that the user 125 has previously submitted a print job to the cloud print service 102, and, more specifically, has submitted a print job related to the web application 116 and designating the virtual print queue 140A so as to enable later printing in conjunction with the roving printing scenarios described herein.

Thus, in the example of FIG. 3A, it may be assumed that the user 125 has arrived at the cloud-aware printer 118 and wishes to print the previously submitted print job. In the example, the user has logged into the cloud print service 102 in conjunction with having logged into an account of the user 125 which is associated with a suite of productivity applications provided by a provider of the cloud print service 102 and/or the application 116, i.e., a provider of the cloud print server 104 and/or the application server 114.

Thus, in the example of FIG. 3A, a URL 304 corresponds to a URL provided by the servers 104/114 and to corresponding applications represented by the application 116 and the cloud print service 102. Specifically, in the example and as shown by corresponding tabs, such applications include a mail application, a calendar application, and the printers associated with the cloud print service 102. Of course, additional or alternative applications may be provided, as well.

In the example, a portion 306 identifies a document "TPS report cover" which the user 125 desires to print. Meanwhile, a printer list 308 provides a list of printers which may be selectable by the user 125. As shown, the printer list 308 may include an option for roving printing (illustrated as "Print-on-the-go!") in which the user may fetch or otherwise retrieve the document "TPS report cover" for printing on a nearby printer, e.g., for printing using the cloud-aware printer 118 upon arrival of the user 125 at the second location 122.

In the example of FIGS. 3A-3G, as described below, it is assumed that the user 125 will identify the cloud-aware printer 118 through the use of a barcode associated therewith, which may be scanned by the mobile device 302. Of course, as described herein, the user 125 may utilize additional or alternative techniques for identifying the cloud-aware printer 118 when retrieving a document for printing from the virtual print queue 140A.

Figure 3B:
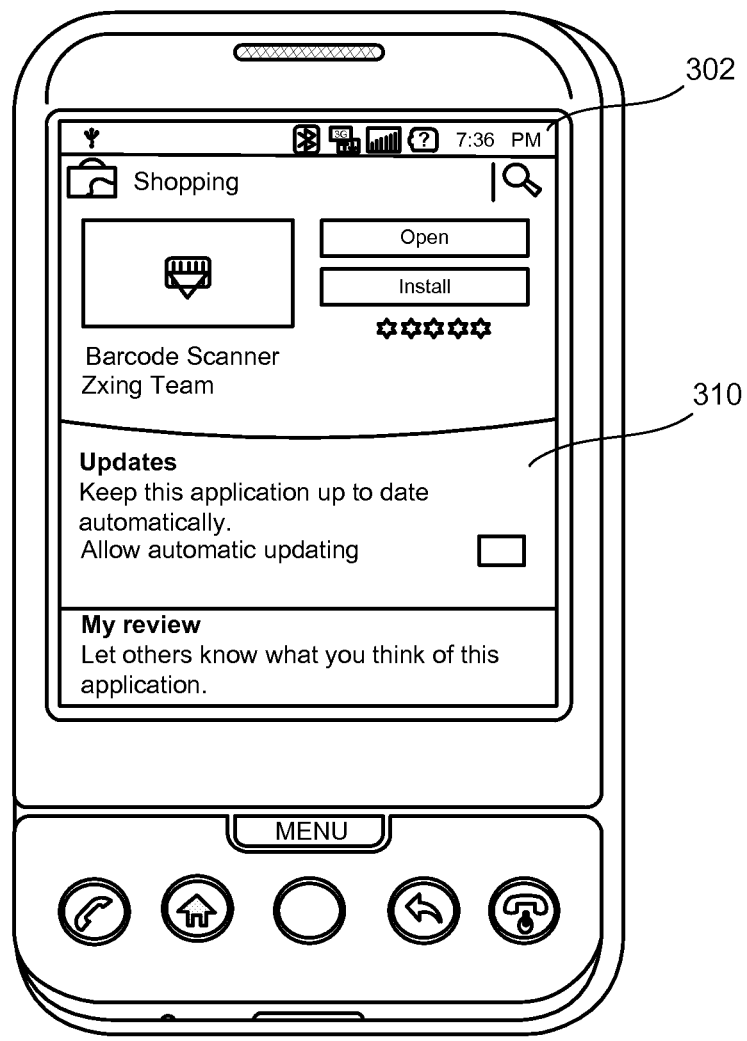

In general, an ability of the mobile device 302 to scan such a barcode associated with the cloud-aware printer 118 may rely on installation of availability of associated barcode scanning software on the mobile device 302. Consequently, FIG. 3B illustrates an example in which the mobile device 302 does not initially include such barcode scanning software, so that the user 125 may be initially required to download such barcode scanning software, as shown in the portion 310 in the screenshot of FIG. 3B.

Figure 3C:
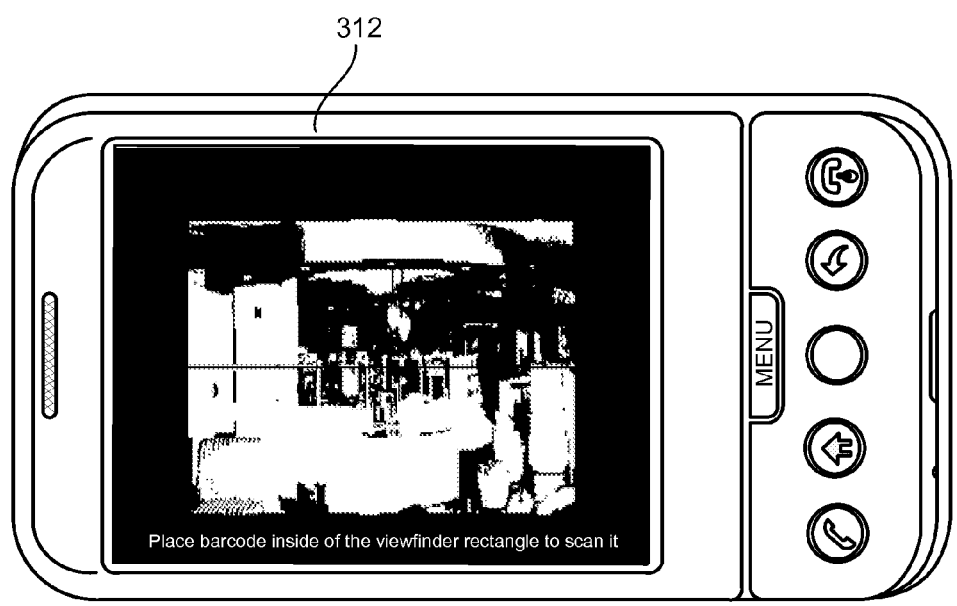

Based on the availability of such barcode scanning software, the mobile device 302 may be utilized to scan a barcode of the cloud-aware printer 118, as shown in the portion 312 in the screenshot of FIG. 3C. Specifically, as shown, the user may be enabled to utilize a camera or other scanning function of the mobile device 302, and may be provided with instructions, e.g., "place barcode inside of the view finder rectangle to scan it," and may thereby scan the barcode associated with the cloud-aware printer 118.

Figure 3D:
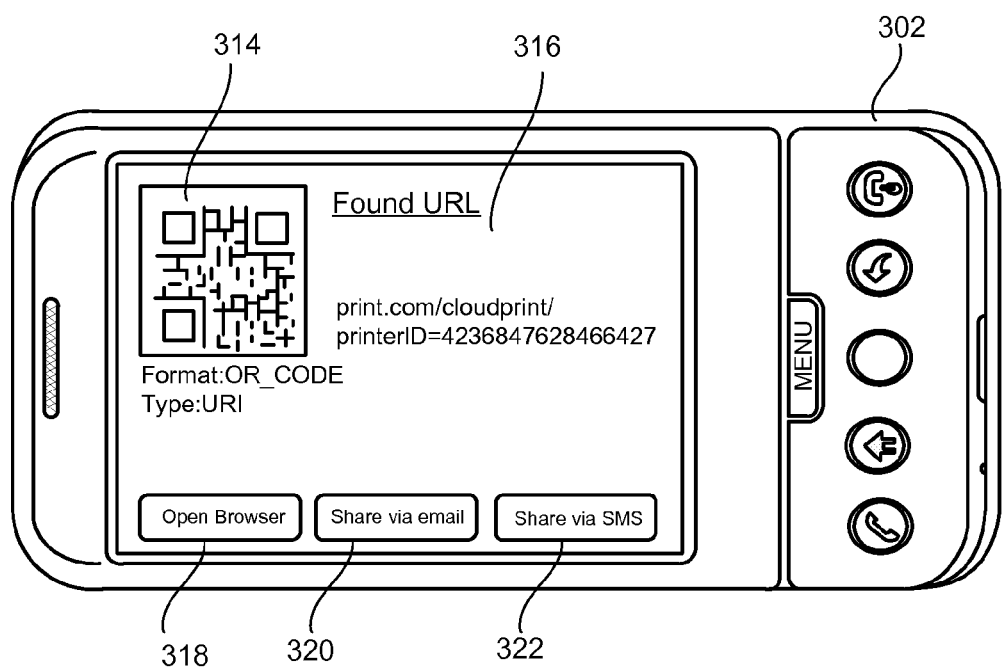

In this way, as shown in the example of FIG. 3D, a barcode 314 may be obtained and identified by the mobile device 302 and associated software. Specifically, as shown, the barcode may be a quick response (QR) code with an associated uniform resource identifier (URI). The use of such codes and URIs, by themselves, are generally well known, and are not described here in further detail, except as may be necessary or helpful in understanding operations of the systems and methods of FIGS. 1-4.

In general, however, it may be appreciated that the code 314 may be utilized by the cloud print service 102, e.g., by the printer identifier 141, to identify the cloud-aware printer 118 from among the various printers registered with the cloud print service 102 and with the user account of the user 125 in conjunction with features and operations of the registration manager 126 of the cloud print service 102.

Of course, FIG. 3D provides merely one example, and it will be appreciated that various other techniques may be used to identify the cloud-aware printer 118. For example, Near Field Communications (NFC) techniques may be implemented which enable the mobile device 302 to identify the cloud-aware printer 118. In other implementations, a browser in the mobile device 302 may be used to manually enter a URL associated with (e.g., printed on) the printer and/or a short URL (e.g., a redirected URL created for the purposes of shortening a relatively long URL). In still other implementations, the user may enter a unique name of the printer, or may use a camera and associated text-recognition software of the mobile device 302 to recognize the cloud-aware printer 118.

Thus, upon identifying the cloud-aware printer 118, the cloud print service 102 may provide a URL associated with the cloud-aware printer 118 to the mobile device 302. Specifically, as shown within a portion 316 in the screenshot of FIG. 3D, the user 125 may be notified that the URL for the printer 118 has been located. Consequently, the user 125 may be provided with one or more options for utilizing the cloud-aware printer 118. Specifically, as shown, a selectable element 318 may be provided to the user 125 for opening a browser window using the identified URL. Similarly, selectable elements 320, 322 may be provided to the user 325 to enable the user 325 to share the identified URL via email or SMS, respectively.

Figure 3E:
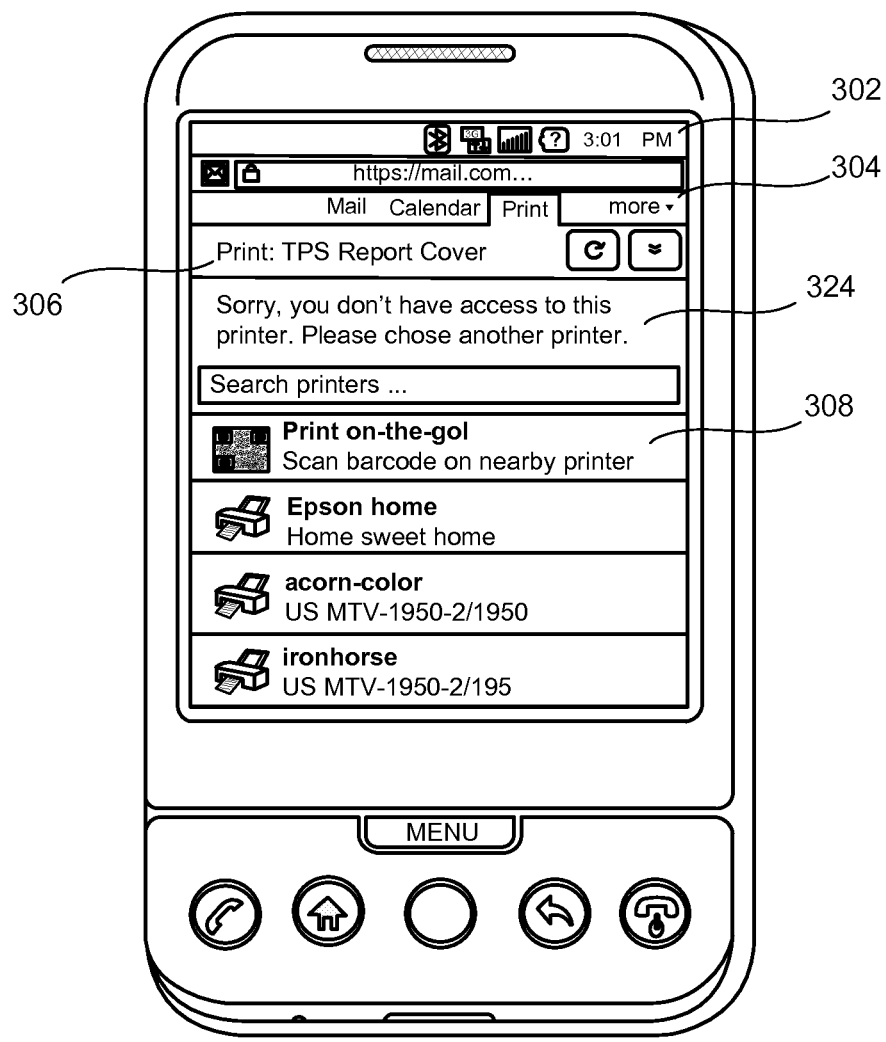

Upon selection of the selectable element 318, in the example of FIG. 3E, the mobile device 302 may attempt to open a browser window using the URL of the portion 316. In the example of FIG. 3E, it may occur that the user 125 does not have access to the identified printer. In such an example, a message 324 may be provided to the user of that access is unavailable and that another printer should be selected. Of course, in such scenarios, it may be possible for the user to register with the cloud-aware printer 118 in order to proceed with printing. For example, the user 125 may request another user of the cloud print service 102 to share the cloud-aware printer 118 with the user account of the user 125.

Figure 3F:
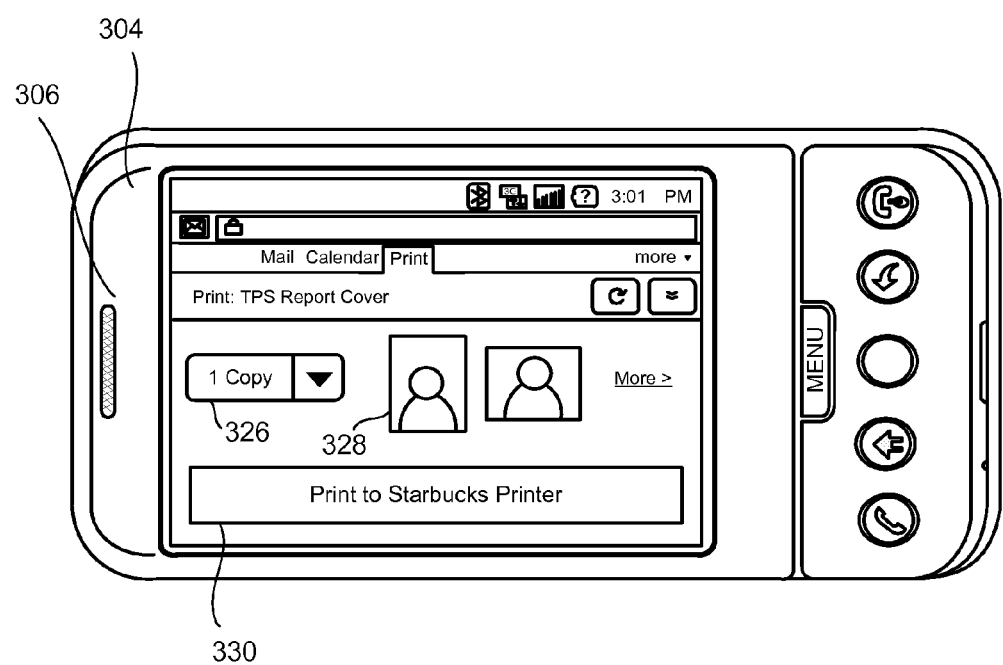

Once the user 125 has registered with the cloud-aware printer 118, or traveled to a different printer at a different location with which the user 125 is already registered, the user may proceed with printing. Specifically, as illustrated in the example of FIG. 3F, the user may be provided with print options to be utilized in conjunction with the desired printing of the document "TPS report cover."

Specifically, as shown, a drop down list 326 may enable the user 125 to select a number of desired copies for printing, while an element 328 may enable the user 125 to select portrait (as opposed to landscape) view for the printed document. Of course, as illustrated, more print options than these may be provided for selection by the user 125. Finally, a selectable element 330 may enable the user to activate printing.

Figure 3G:
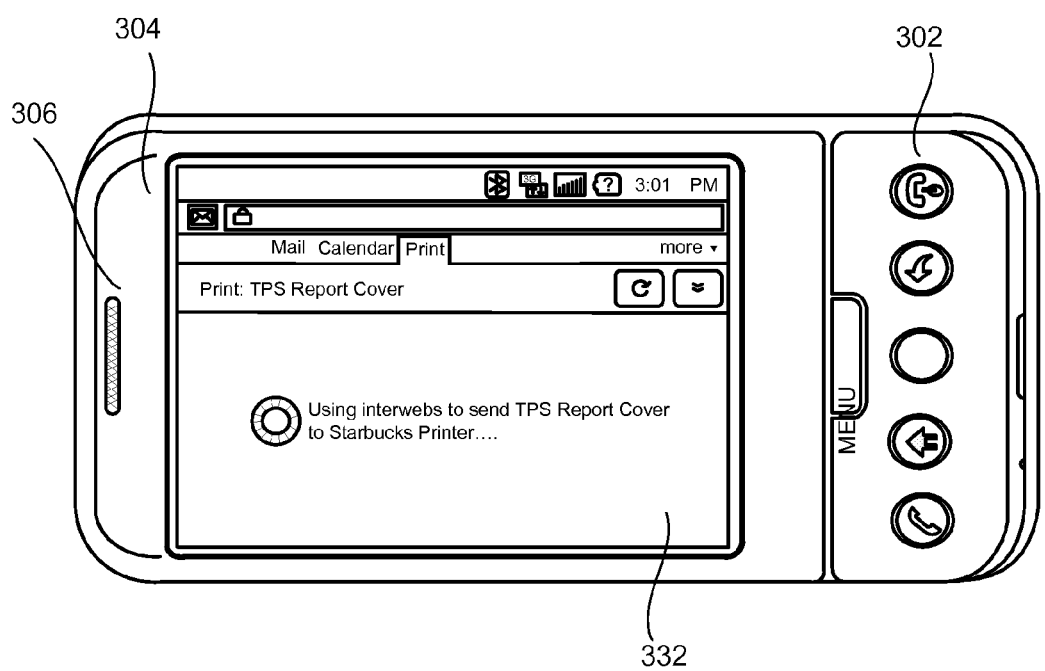

In the example of FIG. 3G, the user 125 has selected the element 334 to commence printing, and, correspondingly, a screen portion 332 illustrates that a message may be provided to the user 125 informing the user 125 that the document "TPS report cover" has been sent to the identified printer. In this way, the user 125 may conveniently receive the printed document at the identified printer.

Figure 4:
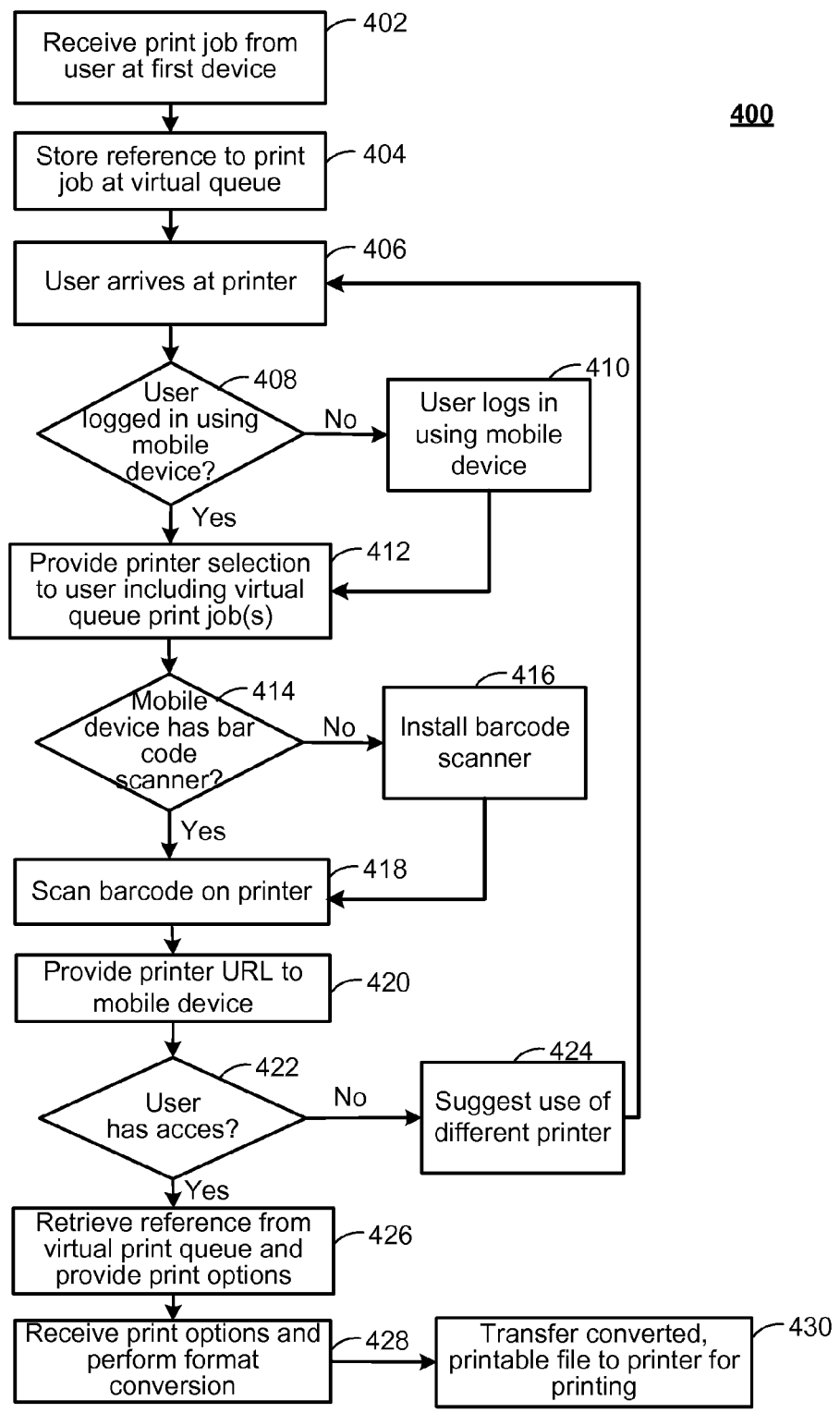
FIG. 4 is a flowchart illustrating more detailed examples of implementations of a cloud print service of FIG. 1 in roving printing scenarios.

FIG. 4 is a flowchart 400 illustrating more detailed example operations of the systems and methods of FIGS. 1-3G. In the example of FIG. 4, a print job may be received from the user 125 at the first device 108 (402). For example, as described herein, the user 125 may represent an employee and the device 108 may represent a network workstation used by the employee in an office of the employee. In another example, the user 125 may represent a student, and the device 108 may represent a desktop or laptop computer used by the student in a dorm room of the student. In yet another example, the user 125 may simply be utilizing a personal computer as the device 108, within a home of the user 125.

In the above and various other scenarios, as described above, the application manager 128 may receive the print job from the user 125 by initially providing the print dialog 113 by way of the print dialog API 130, and by subsequently receiving the print job at the job submit API 132. More specifically, in the example of FIG. 4, the user 125 may use the device 108 to access the application 116 at the application server 114.

For example, with respect to FIG. 3A, as described above, the application 116 may be a document processing application implemented as a web application, and the user 125 may wish to submit a print job related to the document "TPS report cover." Moreover, the user 125 may wish to print the document "TPS report cover" using a remote and/or currently unknown printer. For example, as described herein, the user 125 may wish to print the document "TPS report cover" to a remote location at which the cloud-aware printer 118 is present, i.e., the second location 122, but may wish to ensure that the document is not printed until the user 125 arrives at the second location 122. For example, in some of the examples provided above, in scenarios in which the user 125 is an employee working in a corporate network environment, the user 125 may wish to print the document "TPS report cover" to a printer which is present on a different floor, or in a different building, or in an entirely different campus of the employer of the user 125. In another example, in scenarios in which the user 125 is a student, the user 125 may wish to print the document "TPS report cover" to the cloud-aware printer 118 which may be present at a computer lab or other student resource facility as the second location 122.

In additional or alternative examples, as also described herein, the user 125 at the first location 120 may have no knowledge of the identity of the cloud-aware printer 118 and/or the second location 122 at a time of printing of the document "TPS report cover." For example, in scenarios in which the user 125 represents an employee, the user 125 may be traveling among various different corporate locations, and may not have knowledge of an exact time or location of which he or she will need to print the document in question. In scenarios in which the user 125 represents a student, the user 125 may have access to a number of different student resource facilities providing printers, and may not be certain of which of these student resource facilities will be used to print the document in question. In still other examples, the user 125 acting in a personal capacity may be traveling, e.g., on vacation, and may be planning on being present at a number of different cities or locations, and again may not be aware of a time or location at which the document in question will be printed.

Thus, as described, upon viewing the print dialog 113 provided by the print dialog API 130, the user 125 may utilize the printer selection drop down list 113A, or other suitable mechanism, to select association of the print job to be submitted with storage in association with the virtual print queue 140A. For example, in the terminology of FIG. 3A, the virtual print queue 140A may be identified within the drop down list 113A as "print on the go." Thus, the user 125 may select this option using the list 113A, and, optionally, may use the authentication drop down list 113B to select and possibly parameterize or characterize a type or extent of authentication that will be required by the user 125 or other authorized party at a later time of printing.

In the example of FIG. 4, as described above, the print job in question is related to the web application 116, and, therefore, the user 125 need not provide all or any print options to be associated with the print job. For example, in some scenarios, the user 125 may simply select the document in question, and thereafter submit the print job using the print dialog 113, to be received by the job submit API 132. In other examples, the user 125 may utilize the print dialog 113 to select between a certain known subset of print options which are known to be present at any of the available printers. For example, such print options may include basic print options, e.g., a number of copies, a portrait or landscape mode, or other such features. For example, if the user 125 has a certain number of printers associated with his or her user account as stored using the registration manager 126, then a subset of print options which is common to all registered printers (or a subset thereof) may be made available by way of the print dialog 113.

Thus, in these and other scenarios, once the print job is received from the user 125 by way of the device 108, the cloud print service 102, e.g., the application manager 128, may store an appropriate link or other reference to the web application 116 in conjunction with the virtual print queue 140A (404). For example, the job submit API 132 may receive the job submit and store a URL of the document to be printed at the virtual print queue 140A. Advantageously, as described herein and as may be understood from appreciating the description, the user 125 need not determine or be aware of all desired or available print options at the time of submitting the print job. Moreover, it is not necessary in these examples for the format converter 136 to execute any relevant format conversions for converting the document to be printed into a printable format compatible with the cloud-aware printer 118 that ultimately may be selected as the destination printer. Rather, the print job may simply be stored with reference to the document of the web application 116, until such later time as the subsequent print initiation and associated print options are received from the user 125.

Consequently, at a later time, the user 125 may arrive at the cloud-aware printer 118 at the second location 122, such as in the examples described above (406). As described above with respect to the examples of FIGS. 3A-3G, and with respect to the mobile device 124 of FIG. 1, the user 125 may utilize the mobile device 302 to execute the desired print job using the cloud-aware printer 118. In many cases, the user 125 already may be logged into a user account associated with the web application 116. For example, as just described with respect to the examples of FIGS. 3A-3G, the web application 116 may be a document processing application included within a suite of web applications provided by an operator of the application server 114. In such scenarios, the user 125 already may be logged into a corresponding user account, so as, for example, to send and receive emails, receive calendar and other schedule notifications, and otherwise to interact with the application suite.

Thus, if the user is not already logged in to such a user account using the mobile device 302 (408), then the user may easily log in using the mobile device 302 (410). As described, such a login procedure may be executed in a manner which is otherwise completely conventional and therefore familiar to the user 125, and which does not provide any additional burden on, or knowledge by, the user 125. Moreover, the ability to provide such authentication may reduce or eliminate the need of the cloud-aware printer 118 to maintain relevant authentication data.

Of course, it will be appreciated from the above description that additional or alternative authentication measures may be used. For example, as described, the authentication manager 135 may utilize authentication parameters submitted by way of the authentication drop down list 113B, as well as functions and features of the cloud-aware printer 118 itself in receiving and verifying such authentication information as may be submitted by the user 125 using the user input 150 and display 152 of the cloud-aware printer 118 itself. However, as may be apparent, such authentication techniques may require additional resources on the part of the cloud print service 102, the cloud-aware printer 118, and of the user 125. Nonetheless, availability of such authentication techniques may be useful in various scenarios, e.g., such as when an enhanced level of security is desired, or when the user 125 does not have access to an appropriate mobile device 302.

In the example of FIG. 4, it may occur that once the user 125 is logged in using the mobile device 302, the corresponding printer selection list 308 of FIG. 3A may be provided to the user 125, including the virtual print queue job. As shown in FIG. 3A, the corresponding printer selection may be identified using appropriate terminology, e.g., "print-on-the-go," and additional instructions may be provided for executing the corresponding printing, e.g., such as instructions for scanning a barcode of, or otherwise identifying, the relevant, nearby printer.

Thus, as shown with respect to FIG. 3B, if the mobile device 302 does not currently have a corresponding barcode scanner software application (414), then the user may be required to install such a barcode scanner (416). Once the barcode scanner application is present, the user 125 may proceed to scan the barcode on the nearby printer, as shown and described above with respect to FIG. 3C (418).

In this way, the printer identifier 141 may interact with the registration manager 126 to identify the cloud-aware printer 118 as being registered with the cloud print service 102. Subsequently, the print job router 138 may provide a printer URL associated with the printer 118 to the mobile device 302 (420), as shown with respect to FIG. 3D above.

Upon an attempt of the user 125 to access the provided printer URL, e.g., through the use of the selectable elements 318-322, the print job router 138, in conjunction with the registration manager 126, may determine whether the user 125 has access to the identified printer (422). If not, then, as shown in portion 324 of FIG. 3E, the print job router 138 may inform the user 125 that access has been denied, and may suggest use of a different printer (424), in which time the user 125 may travel to a different printer (406) to further attempt printing of the desired document.

On the other hand, if the user 125 has access (422), then the print job router 138, e.g., the job fetch API 142, may retrieve the relevant reference from the virtual print queue 140 and provide print options to the user 125 by way of the mobile 302 (426). For example, the print job router 138 may utilize the application data fetcher 134 to utilize the reference of the virtual print queue 140A and access the web application 116 to retrieve the desired document "TPS report cover" to be printed.

Thus, as shown with respect to FIG. 3F, the user 125 may be provided with various print options, and may select from among these before submitting a final request for printing to proceed. At such time, the print job router 138 may receive the document in question from the application 116 by way of the application data fetcher 134, as just described, and may receive the print options from the user 125 by way of the mobile device 302. In this way, the document in question and all associated print options may be provided together to the format converter 136, which may then proceed with executing the conversion thereof into a printable file which is compatible with printing by the cloud-aware printer 118. Thereafter, the converted printable file may be provided to the print job router 138 and thereby sent to the cloud-aware printer 118 for printing thereon (430). In this way, the user 125 may receive the document to be printed at a time, place, and manner of the user's choosing, and in a manner which is convenient and flexible for the user 125.

It may be appreciated that, in various scenarios, the associated technical details for implementing the above described systems and methods may vary. For example, the example of FIG. 1 illustrates the cloud print service 102 and associated functionality as executing within the cloud print server 104. However, it may be appreciated that some or many of the above described functionalities may be performed using a browser application or other hardware/software of the mobile device 302. For example, corresponding JavaScript code or other appropriate coding techniques may be used to cause a browser of the mobile device 302 to facilitate identification of the cloud-aware printer 118 as being associated with the cloud print service 102 and/or the user 125, to identify and fetch the desired document from the application 116, and/or to facilitate transfer of the print job in question from the virtual print queue 140A to a local print queue of the cloud-aware printer 118. Further, the mobile device 302 may be utilized to perform various status checks or other monitoring of the print job in question, e.g., may implement various functionalities described above with respect to the job control API 143. Many other examples and variations of the systems and operations of FIGS. 1 to 4 would be apparent to one skilled in the art.

Figure 5:
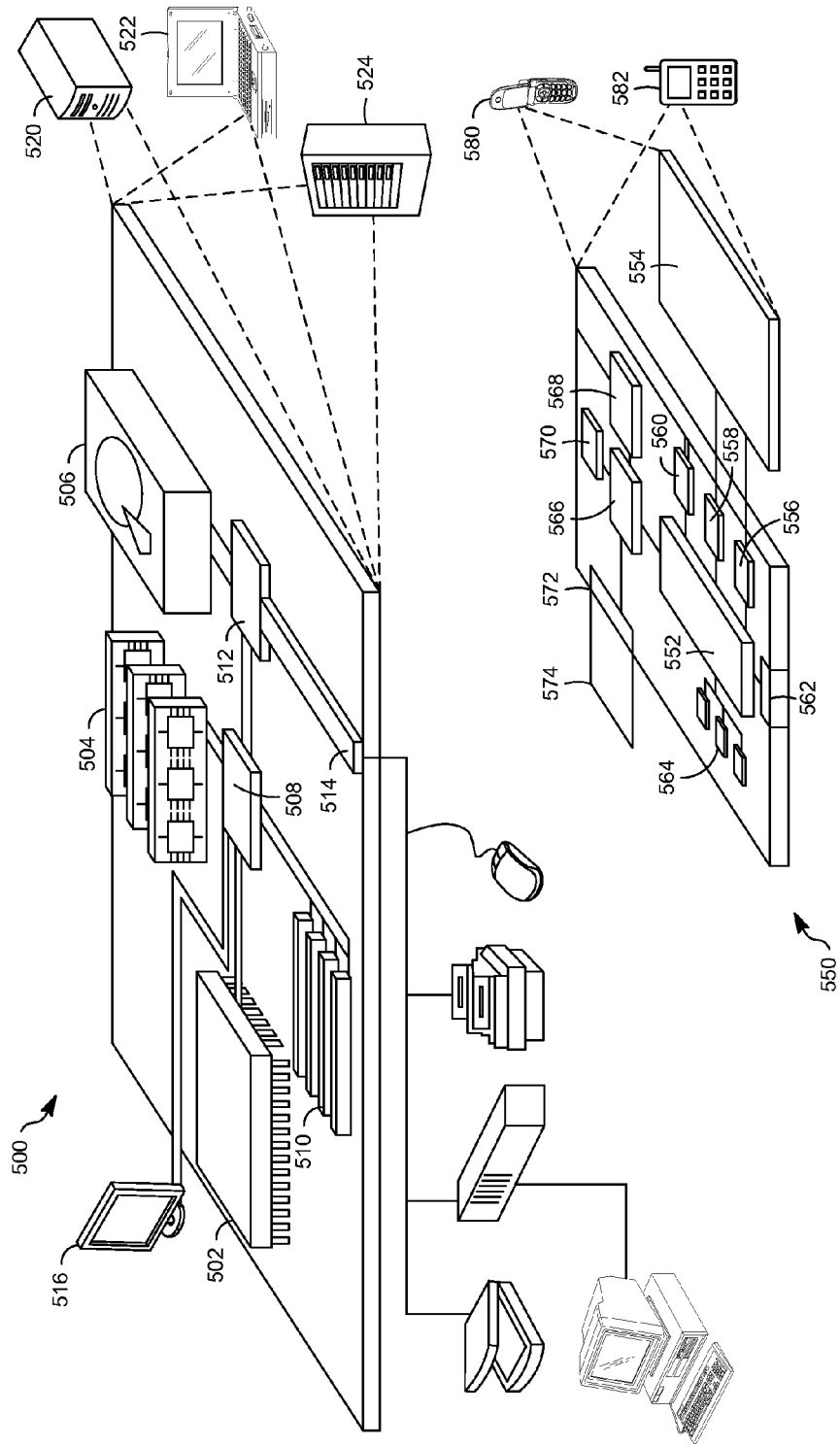
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server including instructions stored on a non-transitory computer-readable medium and executable by at least one processor, the print server comprising:
    an application manager configured to cause the at least one processor to provide a print dialog, over a network, to an application utilized at a mobile device, the print dialog providing a list of printers for selection, the list of printers including one or more available printers and a generic printer representing a virtual print queue at the print server, the virtual print queue configured to store print jobs designated for roving printing,
    the application manager configured to cause the at least one processor to receive, over the network, from the application utilized at the mobile device at a first location, a print job, the print job identifying a selection of the generic printer and content to be printed, the application manager being further configured to store the print job in association with the virtual print queue; and
    a print job router configured to provide a printer identifier associated with a selected printer to the mobile device at a second location in response to a scan by the mobile device on the selected printer that obtains identification information identifying the selected printer, the print job router configured to determine whether a user of the mobile device has access to the selected printer based on authentication credentials of the user received from the mobile device,
    the print job router configured to retrieve the print job from the virtual print queue and provide print options to the user via the mobile device when the user has access to the selected printer,
    the print job router configured to receive a selection of at least one of the print options via the mobile device, and send a printable file having the content to be printed to the selected printer.

2. The print server of claim 1, comprising a format converter configured to convert the content to be printed and print values of print properties for the print job stored in the virtual print queue from a printer-independent format to a printer-specific format corresponding to the selected printer, the print job router configured to send, over the network, the printable file having the content to be printed and the print values in the printer-specific format, over the network, to the selected printer for printing.

3. The print server of claim 2, wherein the format converter is configured to receive the print values within the print job when received from the application utilized at the mobile device at the first location.

4. The print server of claim 2, wherein the format converter is configured to receive the print values from the mobile device after determining that the user of the mobile device has access to the selected printer.

5. The print server of claim 1, wherein the one or more available printers provided in the list of printers within the print dialog are printers registered with a user account of the user of a cloud print service, and the generic printer is a selectable un-identified printer provided within the list of printers.

6. The print server of claim 1, wherein the application includes a web application provided by an application server and utilized at the mobile device over the network.

7. The print server of claim 6, wherein the application manager is configured to store the print job in association with the virtual print queue including storing a link to the content to be printed in the virtual print queue, the link including a uniform resource locator (URL).

8. The print server of claim 7, wherein the application manager includes an application data fetcher configured to utilize the link to the content to be printed to retrieve the application content when the mobile device is at the second location and the print job router has determined that the user has access to the selected printer, the content to be printed having a printer-independent format, the print server further comprising:
    a format converter configured to convert the printer-independent format of the content to be printed to a printer-specific format corresponding to the selected printer for inclusion within the printable file to be transmitted to the selected printer.

9. The print server of claim 1, wherein the printer identifier includes a uniform resource locator (URL).

10. The print server of claim 1, wherein the selection related to the printer identifier includes an action to open a browser window.

11. The print server of claim 1, wherein when the print job router determines that the user does not have access to the selected printer, the print job router is configured to inform the user that access has been denied and suggest use of a different printer.

12. The print server of claim 1, wherein the application manager includes at least one application programming interface (API) configured to enable communication with the application utilized at the mobile device, and the print router job includes at least one API configured to enable communication with communication with the printer.

13. A method for roving printing using a print server, the method being performed by at least one processor, the method comprising:

provideing a print dialog, over a network, to an application utilized at a mobile device, the print dialog providing a list of printers for selection, the list of printers including one or more available printers and a generic printer representing a virtual print queue at the print server, the virtual print queue configured to store print jobs designated for roving printing;

receiving, over the network, from the application utilized at the mobile device at a first location, a print job, the print job identifying a selection of the generic printer and content to be printed;

storing the print job in association with the virtual print queue;

providing a printer identifier associated with a selected printer to the mobile device at a second location in response to a bar code scan by the mobile device on the selected printer that obtains identification information identifying the selected printer;

determining whether a user of the mobile device has access to the selected printer based on authentication credentials of the user received from the mobile device;

retrieving, when the user has access to the selected printer, the print job from the virtual print queue and providing print options to the user via the mobile device; and receiving a selection of at least one of the print options via the mobile device and sending a printable file having the content to be printed to the selected printer.

14. The method of claim 13, comprising:

converting the content to be printed and print values of print properties for the print job stored in the virtual print queue from a printer-independent format to a printer-specific format corresponding to the selected printer, and sending the printable file having the content to be printed and the print values in the printer-specific format, over the network, to the selected printer for printing.

15. The method of claim 13, wherein the application includes a web application provided by an application server and utilized at the mobile device over the network.

16. A computer program product tangibly embodied on a non-transitory computer-readable medium and includes executable code that, when executed, is configured to cause at least one processor to:

provide a print dialog, over a network, to an application utilized at a mobile device, the print dialog providing a list of printers for selection, the list of printers including one or more available printers and a generic printer representing a virtual print queue at a print server, the virtual print queue configured to store print jobs designated for roving printing;

receive, over the network, from the application utilized at the mobile device at a first location, a print job, the print job identifying a selection of the generic printer and content to be printed;

store the print job in association with the virtual print queue;

provide a printer identifier associated with a selected printer to the mobile device at a second location in response to a scan by the mobile device on the selected printer that obtains identification information identifying the selected printer;

determine whether a user of the mobile device has access to the selected printer based on authentication credentials of the user received from the mobile device;

retrieve, when the user has access to the selected printer, the print job from the virtual print queue and provide print options to the user via the mobile device; and receive a selection of at least one of the print options via the mobile device and send a printable file having the content to be printed to the selected printer.

17. The computer program product of claim 16, wherein the executable code, when executed, is further configured to convert the content to be printed and print values of print properties for the print job stored in the virtual print queue from a printer-independent format to a printer-specific format corresponding to the selected printer, and send the printable file having the content to be printed and the print values in the printer-specific format, over the network, to the selected printer for printing.

18. The computer program product of claim 16, wherein the printer identifier is a uniform resource locator (URL).

19. The computer program product of claim 16, wherein the selection related to the printer identifier includes an action to open a browser window.

* * * * *